United States Patent [19]

Tucker et al.

[11] Patent Number: 4,553,560

[45] Date of Patent: Nov. 19, 1985

[54] ANTI-SIPHON CONTROL VALVE

[75] Inventors: Abraham I. Tucker; Leonard G. Spelber, both of San Diego, Calif.

[73] Assignee: Wastemate Corporation, San Diego, Calif.

[21] Appl. No.: 504,219

[22] Filed: Jun. 14, 1983

[51] Int. Cl.⁴ ............................................. F16K 24/02
[52] U.S. Cl. .................................... 137/218; 137/359; 251/339
[58] Field of Search ............ 4/191, DIG. 4; 137/217, 137/218, 343, 359, 360, 447; 251/315, 339

[56] References Cited

U.S. PATENT DOCUMENTS

| | | | |
|---|---|---|---|
| 1,315,828 | 9/1919 | Gilette | 137/360 |
| 1,541,558 | 6/1925 | Gade | 137/360 |
| 2,253,372 | 8/1941 | Fischer | 137/360 X |
| 2,303,037 | 11/1942 | Fredrickson | 137/218 |
| 2,536,372 | 1/1951 | Jordan | 137/218 X |
| 2,584,436 | 2/1952 | Donaldson | 137/218 |
| 2,604,113 | 7/1952 | Barsano | 137/218 |
| 2,869,572 | 1/1959 | Person | 137/218 |
| 3,180,352 | 4/1965 | Kersten et al. | 137/218 |
| 3,416,556 | 12/1968 | Nelson | 137/218 |
| 3,419,036 | 12/1968 | Ward | 137/218 |
| 3,424,188 | 1/1969 | Whitaker et al. | 137/218 |
| 3,424,189 | 1/1969 | Woodford | 137/218 |
| 3,454,032 | 7/1969 | Hinz et al. | |
| 3,565,097 | 2/1971 | Costa et al. | |
| 3,618,629 | 11/1971 | Heyer et al. | 137/218 |
| 3,724,487 | 4/1973 | Hunter | 137/218 |
| 3,732,884 | 5/1973 | Strom | 137/218 |
| 3,827,670 | 8/1974 | Saarem | |
| 4,080,980 | 3/1978 | Hunter | 137/218 |
| 4,357,954 | 11/1982 | Hunter | 137/218 |

Primary Examiner—Gerald A. Michalsky
Attorney, Agent, or Firm—Brown, Martin & Haller

[57] ABSTRACT

An on/off valve, preferably of the ball type, with an anti-siphon feature. The valve has concentric opposite direction flow with open structured support elements to maintain the inlet tube properly positioned within the elongated housing. A cup-shaped poppet-type float valve prevents fluid from spraying out of air vents upon opening of the ball valve. The control valve is particularly adapted for indoor use.

4 Claims, 5 Drawing Figures

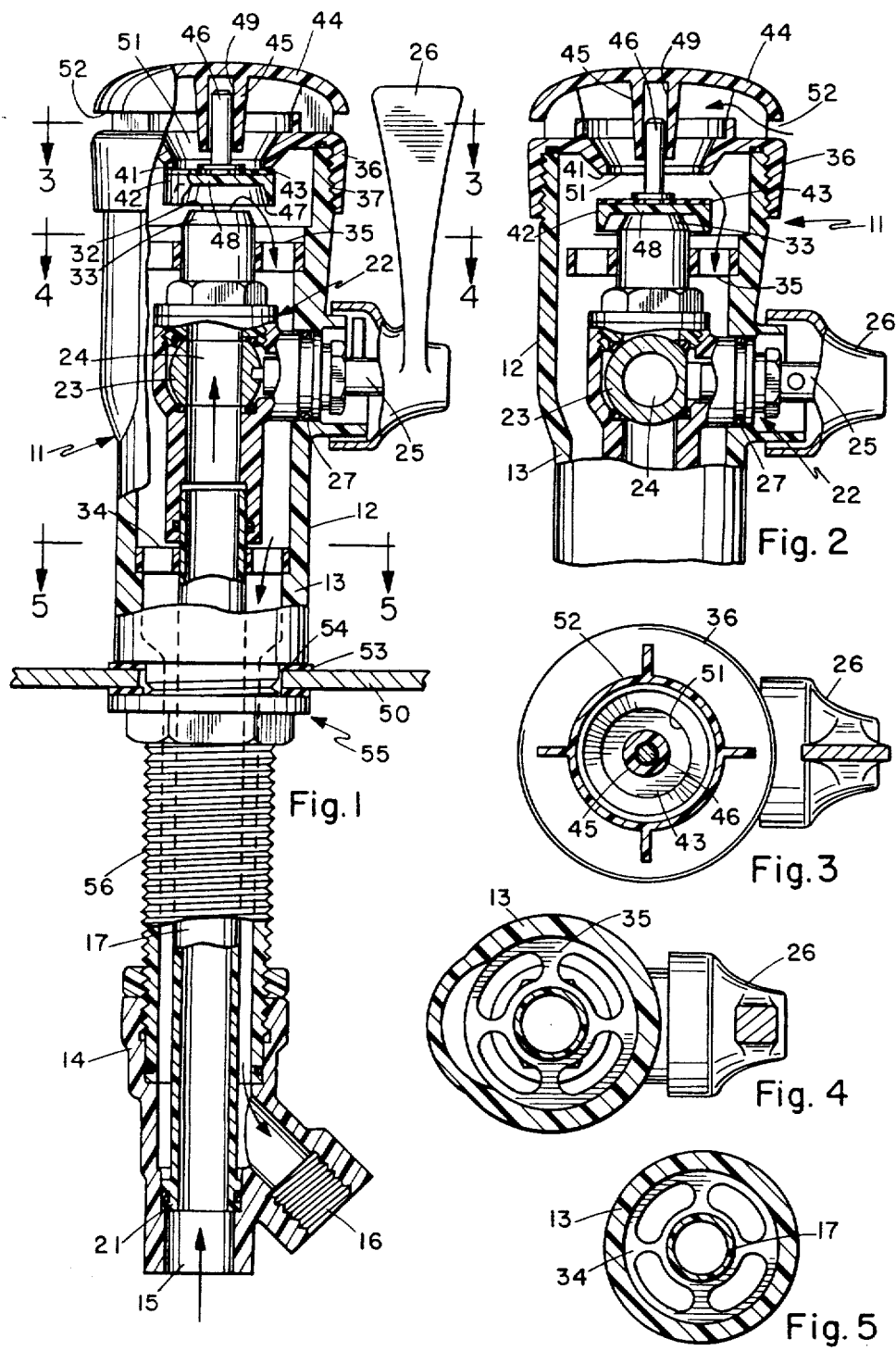

… (4,553,560)

ANTI-SIPHON CONTROL VALVE

FIELD OF THE INVENTION

This invention relates generally to fluid control valves and particularly concerns an anti-siphon valve with concentric fluid flow.

BACKGROUND OF THE INVENTION

Anti-siphon features for control valves have previously been available. A typical drawback to many of these valves is that, upon opening of the valve, an instantaneous spray of fluid out of the air vent openings occurs. When such valves are used outside of buildings, the small amount of instantaneous spray is generally not important. However, for household use, such outward spray could not be tolerated.

Poppet-type anti-siphon valves have typically been part of a flow-control device employing a stem valve. Where it is desired to employ all of the fluid pressure available, a stem valve is disadvantageous because it provides an impediment to full flow and causes a pressure drop in the fluid.

SUMMARY OF THE INVENTION

Broadly speaking, this invention comprises a fluid control valve with concentric reverse direction flow preferably controlled by a ball valve and incorporating an anti-siphon feature.

A housing with an interior inlet tube generally concentrically mounted within the housing provides reverse direction flow of fluid within the housing. A ball valve is positioned to control flow in the inlet tube with the valve control handle extending outwardly through the wall of the housing. A short stroke poppet-type anti-siphon float valve is provided at the outlet of the ball valve. This poppet valve structure either closes the outlet port of the ball valve when fluid pressure is lost or, under the influence of normal flow, it closes the air vents communicating with the interior of the housing allowing reverse fluid flow within the housing.

The short stroke poppet valve, which functions as the anti-siphon structure, has an inverted cup shape so that, when the ball valve is opened, all fluid flow is directed downwardly or in the reverse direction and none of it can escape through the air vents at the upper end of the housing.

BRIEF DESCRIPTION OF THE DRAWING

The objects, advantages and features of this invention will be more readily appreciated from the following detailed description when read in conjunction with the accompanying drawing in which:

FIG. 1 is a side view with portions cut away of the valve structure of the invention;

FIG. 2 is a partial view similar to FIG. 1 showing valve elements in a different position;

FIG. 3 is a cross section taken along line 3—3 of FIG. 1;

FIG. 4 is a cross section taken along line 4—4 of FIG. 1; and

FIG. 5 is a cross section taken along line 5—5 of FIG. 1.

DESCRIPTION OF THE PREFERRED EMBODIMENT

With reference now to the drawing and more particularly to FIGS. 1 and 2 thereof, there is shown a control valve 11 formed with an elongated housing 12 having external wall 13. At the bottom end of the housing is a lower housing 14 having an inlet port 15 and an outlet port 16. An inlet tube 17 is substantially concentrically mounted within the housing with the lower end 21 of the tube connected with inlet port 15. The interconnections of the housing, lower housing and inlet tube are made with appropriate lock nuts, washers, O-rings and gaskets as needed.

Mounted to the upper end of inlet tube 17 is ball valve structure 22 having a ball 23 with a diametric opening 24 therethrough, the ball being connected to a stem 25 which is in turn connected to a hand-operated lever or knob 26 to rotate the ball. The stem extends outwardly from the interior of the housing through opening 27 with appropriate packing, washers, nuts and O-rings. At the opposite end of the ball valve is outlet port 32 having a frusto-conical external taper 33.

The upper end of inlet tube 17 is positioned and supported within the housing by means of support 34 having an open web structure. Similarly, the upper end of the ball valve assembly is supported within the housing by means of support 35 having a similar open structure.

At the upper end of the housing is a float valve assembly having a collar 36 connected to the housing by mutually engaging threads 37. The collar has a float valve seat formed as annular rim 41. Float valve 42 has a resilient disc 43 on its upper end which makes a sealing contact with annular rim 41. At the uppper end of the float valve assembly is cap 44 having float valve guide 45 connected thereto. The guide has an axial bore 49 in which float valve stem 46 is mounted for limited longitudinal movement. The stem is secured to float valve 42 as a guide for that valve. The float valve is made with an interior cup shape 47 having a flat inner surface 48 adapted to rest on the upper edge of ball outlet 32.

In normal quiescent or uncharged condition as shown in FIG. 2, the float or poppet valve 42, under the influence of gravity, resides on outlet port 32 of the ball valve thereby opening the interior of the housing to atmospheric pressure through axial opening 51 in the float valve assembly and then through circumferential opening 52 beneath cap 44. In addition to opening the interior of housing 12 to the atmosphere, in this position float valve 42 closes the outlet port of the ball valve. When ball valve 23 is rotated 90° to the ON condition as shown in FIG. 1, fluid entering input port 15 passes through the inlet tube and the ball valve outlet port 32 thereby forcing poppet valve 42 upward against seat 41 thereby closing the interior of the housing to the atmosphere. At the same time fluid flows upwardly from the ball valve outlet port against the interior of poppet valve 42 and then downwardly around the outside of the ball valve structure and the inlet tube inside housing 12 and exiting through outlet port 16.

For this reason, as shown in FIGS. 1 and 2, the diametric opening 24 of the ball valve ball 23 is preferably the same diameter as the inside diameter of inlet tube 17 to provide substantially unobstructed flow also minimizing pressure drop are the flared cup shape interior 47 of float valve 42, the frustoconical external taper 33 of the outlet port 32 of inlet tube 17, and the location of outlet port 16 at the lower end of elongated housing 12 rather than directly after the float valve 42.

In order to insure free movement of stem 46 within guide 45, the relative tolerances are such that the stem will always be smaller than the bore. Additionally, one side of the stem is made flat so that there is no possibility of pressure or vacuum occurring between the end of the stem and the blind end of the bore 49 is guide 45.

It is contemplated that the control valve of this invention will have various purposes but one of the primary purposes is to supply water to a garbage disposer, particularly a disposer of the type that is powered by water pressure alone. For this reason, it is desired to use all available inlet water pressure even though the garbage disposer may be able to operate at pressures ranging from 30 to 125 lbs per square inch. The use of a stem valve where the incoming water pressure is at the low end of this range could result in pressure drop of such magnitude that the water pressure would not be adequate to operate the disposer. Thus it is important in the valve used for this purpose to provide the minimum impediment to water main pressure being utilized by the equipment.

Because of building or other code requirements, the anti-siphon aspect is necessary in such a device. Without the anti-siphon feature, it is possible that if the water main became broken at some point distant from the valve, a siphon effect could suck contaminated water from the disposer back into the main line as the water flows out due to the break. Additionally, for similar purposes, codes may require that the outlet of the valve, the ball valve in this case, be located at least 4.25 inches above the flood level of the sink. The sink top 50 fits between gasket 53 seated on shoulder 54 of housing 12 and lock nut, washer and gasket combination 55. For purposes of engaging lock nut combination 55 and the mounting of lower housing 14, the entire lower reduced diameter portion of housing 12 is externally threaded as indicated by reference numeral 56.

The preferred embodiment of the invention includes a ball valve with the anti-siphon feature. It is contemplated that other types of valve structures could be used in place of the ball valve with equal effectiveness when combined with the float valve.

In view of the above description, it is likely that modifications and improvements will occur to those skilled in the art which are within the scope of the accompanying claims.

What is claimed is:

1. An anti-siphon control valve for fluid flow comprising;
    an enclosed, elongated housing having a first end, a top end, an exterior wall, and an open interior;
    an inlet tube mounted within said housing, said tube having a first end secured within said first end of said housing, and a top end having an outlet port positioned within the interior of said housing intermediate said first and top ends thereof; said top end being cone-frustum shaped externally;
    an open/close valve in said inlet tube for controlling fluid flow through said inlet tube; said valve having an open position for providing for substantially unobstructed fluid flow through said inlet tube;
    means operatively connected to said open/close valve and extending outside said housing for controlling the operation of said open/close valve;
    a poppet valve assembly mounted to said top end of said housing, said assembly having vent openings therethrough, and the interior of said housing being selectively in communication with the atmosphere through said vent openings, said poppet valve assembly further comprising:
        a valve seat;
        a vertically movable poppet valve having an open position whereby said poppet valve seats against and closes said outlet port of said inlet tube when the fluid pressure in said inlet tube at said outlet port is less than or substantially equal to the fluid pressure in the interior of said housing between said outlet port and said housing wall, and whereby said poppet valve opens said outlet port of said inlet tube and engages said valve seat to close the interior of said housing to the atmosphere when the fluid pressure within said inlet tube adjacent said outlet port is greater than the fluid pressure in the interior of said housing adjacent and exterior to said outlet port; and said poppet valve is formed with a cup-faced side facing said outlet port, said cup-shaped side for selectively redirecting fluid flow in reverse direction around said inlet tube in the closed position, and for closing said outlet port in the open position; the shape of said cup-shaped side being such that no fluid escapes through said vent openings upon moving to the closed position; and
    an exit port in said housing wall adjacent said first end of said housing for fluid communication between the interior and exterior of said housing.

2. The control valve of claim 1 wherein said poppet valve has a resilient disk on an upper surface which makes a sealing contact with said valve seat in the closed position.

3. The control valve of claim 2 wherein said poppet valve has an axial stem protruding from the top thereof and said poppet valve assembly has a bore therein for guiding the poppet valve in its movement between open and closed positions.

4. The control valve of claim 1 wherein said open/close valve is a ball valve.

* * * * *